United States Patent [19]
Verhille et al.

[11] Patent Number: 5,491,728
[45] Date of Patent: Feb. 13, 1996

[54] CELL RESEQUENCING SYSTEM FOR A TELECOMMUNICATION NETWORK

[75] Inventors: Henri A. J. Verhille; Michel A. R. Henrion, both of Brussels; Michel P. M. De Somer, Kontich; Bart J. G. Pauwels, Borgerhout, all of Belgium

[73] Assignee: Alcatel N.V., Netherlands

[21] Appl. No.: 123,513

[22] Filed: Sep. 17, 1993

[30] Foreign Application Priority Data

Sep. 18, 1992 [EP] European Pat. Off. .............. 92202866

[51] Int. Cl.$^6$ ................................ H04L 7/00; G06K 5/04
[52] U.S. Cl. ................................................ 375/362; 371/1
[58] Field of Search ................................. 370/108; 371/1

[56] References Cited

U.S. PATENT DOCUMENTS

| | | | |
|---|---|---|---|
| 5,177,739 | 1/1993 | Basnuevo | 370/85.8 |
| 5,321,728 | 6/1994 | Andrieu | 375/106 |
| 5,347,512 | 9/1994 | Fechalos | 370/58.2 |
| 5,351,239 | 9/1994 | Black | 370/84 |
| 5,359,602 | 10/1994 | Diaz | 370/85.8 |

FOREIGN PATENT DOCUMENTS

9102419  2/1991  WIPO .

OTHER PUBLICATIONS

IEEE Journal on Selected Areas in Telecommunication, vol. 9, No. 8 Oct. 1991, NY, US, pp. 1255–1264, T. R. Banniza et al., Design & Technology Aspects of VLSI's for ATM Switches; p. 1257.

Infocom '91, vol. 1, Apr. 1991, NY US, pp. 155–162 K. Ohtsuki et al: "A High Speed Packet Switch Architecture With a Multichannel Bandwidth Allocation".

Primary Examiner—Sandra L. O'Shea
Assistant Examiner—John Ning
Attorney, Agent, or Firm—Ware, Fressola, Van Der Sluys & Adolphson

[57] ABSTRACT

A cell resequencing system is provided for a resequencing section (RS) of a telecommunication network through which cells of communications are transmitted. The resequencing section includes cell switching networks (SN2) having inlets (I2l/I2n/I2N) coupled to inputs (S1l/S1n/S1N) and outlets (N2l/N2m/N2M). The cells are subjected to a first variable time delay. The cell resequencing system (C1l/C1n/C1N, CK1; R2l/R2m/R2M, CK2) includes latches (R2l/R2m/R2M) coupled between the outlets (N2l/N2m/N2M) and the outputs (S2l/S2m/S2M) to subject the cells to a second variable time delay chosen for each cell so the sum of the first and second variable time delay is substantially equal to a predetermined constant time value, which determines the size of the latches (R2l/R2m/R2M). The resequencing section (RS) has two inputs (S1l, S1n/S1N) each coupled to a distinct inlet (I2l/I2n/I2N) via a distinct transmission link (TLl/TLn/TLN). The cells are subjected to at least a fixed transfer delay (TD) during their transfer from the input (S1l/S1n/S1N) to the outlet (N2l/N2m/N2M). The fixed transfer delay forms part of the first variable time delay. The minimum size of the latches (R2l/R2m/R2M) is determined by a difference between a predetermined constant time value and the fixed transfer delay (TD).

18 Claims, 3 Drawing Sheets

CELL RESEQUENCING SYSTEM FOR A TELECOMMUNICATION NETWORK

TECHNICAL FIELD

The present invention relates to a cell resequencing system for a resequencing section of a telecommunication network through which cells of communications are transmitted, said resequencing section having at least one input and at least one output and including at least one cell switching network having at least one inlet coupled to said input and at least one outlet, the cells transmitted from said input to said outlet being subjected to a first variable time delay and said cell resequencing system including latching means coupled between said outlet and said output and adapted to subject said cells to a second variable time delay which is so chosen that for each cell the sum of said first and second variable time delay is substantially equal to a predetermined constant time value, said predetermined constant time value determining the size of said latching means.

BACKGROUND OF THE INVENTION

Such a cell resequencing system adapted to restore at the output the sequence with which the cells were supplied to the input is already known in the art, e.g. from the published International Patent Application PCT/EP89/00941 (HENRION 17). Therein, the resequencing section only includes one cell switching network and all the cells supplied to the input thereof receive a time stamp value. When these cells arrive at the output, i.e. after the first variable time delay which may be different for each cell, they are latched in the latching means constituted by a resequencing buffer and they are only released therefrom when the predetermined constant time value is reached, i.e. after being latched for the second variable time delay.

In this known cell resequencing system it is obvious that the size of the latching means is proportional to the predetermined constant time value and thus increases with the first variable time delay.

In case the first variable time delay becomes relatively large, e.g. because of the presence of a relatively long transmission link between the input of the resequencing section and the inlet of the switching network, the size of the latching means may become unacceptably large.

SUMMARY OF THE INVENTION

An object of the present invention is to provide a cell resequencing system of the above known type but where the latching means remains a reasonable size even if the first variable time delay becomes relatively large.

According to the invention, this object is achieved due to the fact that said resequencing section has at least two of said inputs each coupled to a distinct inlet via a distinct transmission link, said inputs and said transmission links being arranged in a link group, that said cells are supplied at anyone of said inputs of said link group and are subjected to at least a fixed transfer delay during their transfer from said input to said outlet, said fixed transfer delay forming part of said first variable time delay, and that the minimum size of said latching means is determined by the difference between said predetermined constant time value and said fixed transfer delay.

Because the size of the latching means is proportional to the predetermined constant time value, reducing the latter by the fixed transfer delay in order to obtain a new predetermined constant time value which is lower than the former one tends to maintain this size at an acceptable value. The former size of the latching means can thus almost be maintained even if the fixed transfer delay is relatively large, e.g. because of relatively long transmission links.

Another characteristic feature of the present invention is that said fixed transfer delay is substantially equal to the minimum transmission delay below which no cell can be transmitted over a transmission link of said link group.

In practice, the fixed transfer delay is preferably set equal to this minimum transmission delay which is easier to determine, e.g. by measurement or by engineering, than a theorical absolute minimum transfer delay below which no cell can be transmitted from any input to any output of the resequencing section. Moreover, it can be proved that the difference between these two minimum delays is negligible. The minimum transmission delay is thus preferably used as a fixed transfer delay to determine the size of the latching means.

In one embodiment of the invention, said resequencing section includes a plurality of switching networks interconnected by link groups of transmission links and said fixed transfer delay is substantially equal to the sum of the fixed transfer delays of said link groups.

In another embodiment of the invention, said telecommunication network includes a plurality of series connected resequencing sections, each section including a link group of transmission links connected in series with a switching network.

Still in another embodiment of the invention, said resequencing section includes a plurality of parallel branches, each branch comprising at least one link group of transmission links, each link group being connected in series with a switching network, and said fixed transfer delay being substantially equal to the lowest sum amongst the sums of the fixed transfer delays of the link groups of each branch.

A multilink geographically distributed telecommunication network including relatively long transmission links arranged in link groups interconnecting switching networks and wherein the cells, even if they belong to a same communication, are dynamically distributed over the transmission links of the link groups in order to obtain a better traffic distribution is already known, e.g. from the European Patent Application EP 91201915.5 (U.S. Pat. No. 07/918, 450 corresponding thereto), now U.S. application Ser. No. 5,309,430. However, no cell resequencing system is mentioned in this known document.

As already mentioned, in order to perform the resequencing of the cells, each of the latter is associated to a first time stamp value at the inputs of the resequencing section and, at the output of this resequencing section, this first time stamp value is compared with an actual second time stamp value for determining the moment at which a cell may be released from the latching means, the difference between the actual second time stamp value and the first time stamp value being then equal to the original predetermined constant time value of which the fixed transfer delay is subtracted.

This requires that the clock means used for generating the time stamp values must be able to simultaneously generate identical time stamp values both at the inputs and at the output of the resequencing section.

As the present telecommunication network operates with a phase accuracy of about 100 nanosecond, the simultaneous generation of identical time stamp values may be a problem, e.g. for a resequencing section including transmission links of several kilometers. Since in that case it is almost impossible to use common clock means for providing the time stamp values both at the inputs and at the output of the resequencing section, a first idea is to use two distinct clock means: first clock means located at the inputs and second clock means located at the output. Obviously, these first and second clock means needs to be synchronized with accuracy.

Although solutions are known for synchronizing two clock means in frequency, none of these suggests to synchronize them in phase with the accuracy required for this type of application. Accurate phase synchronization is however important in the present case since no precise cell resequencing can be performed if there is no common time phase reference for both the first and the second time stamp values, i.e. if they cannot be accurately correlated in phase or if their phase difference cannot be determined with accuracy. Conversely, it is not strictly necessary that the first and the second clock means are fully synchronous in frequency as long as their phase difference can be determined.

Another object of the present invention is to provide a cell resequencing system of the above known type but which is adapted to a geographically distributed multilink telecommunication network, i.e. which is able to operate on a relatively large resequencing section.

According to the present invention, this other object is achieved due to the fact that said cell resequencing system further includes:

first clock means producing successive first time stamp values which are associated to said cells at each of said inputs;

second clock means producing successive second time stamp values for controlling said latching means; and clock compensation means adapted to compensate both said fixed transfer delay and a clock phase shift between said first and said second clock means.

In more detail, said clock compensation means perform said compensation as a function of a time stamp compensation value which is substantially equal to the sum of a time stamp offset value and of said fixed transfer delay, said time stamp offset value being substantially equal to the difference between a said first time stamp value and a said second time stamp value simultaneously produced by said first and said second clock means respectively.

In this way, the phase difference between the first and the second clock means is expressed by means of the time stamp offset value.

Also another characteristic feature of the present invention is that clock compensation means are coupled between each of said inputs and the transmission link coupled thereto.

Still according to the present invention, said resequencing section further includes buffer means each coupled between said clock compensation means and the transmission link coupled thereto.

If the resequencing section starts from a switching node, the latter generally includes buffer means or output queues located between the outlets of its switching network and the following transmission links. Because the cells are in sequence at the outlets of this switching network but may be subjected to a variable latching delay in the buffer means, the resequencing section starts at these outlets rather than at the outputs of the switching node. In other words, the outlets of the switching network constitute the inputs of the resequencing section. In that case however, the delay during which a cell is latched in the buffer means forms part of the above first variable time delay.

Furthermore, because some circuitry relative of a preceding cell resequencing system is generally located at the outlets of the switching network, the clock compensation means are preferably located at these outlets, i.e. at the inputs of the resequencing section.

The present invention also relates to a method for correlating in phase a first clock means producing successive first time stamp values with a second clock means producing successive second time stamp values, both said clock means forming part of a telecommunication network and being interconnected by at least one transmission link.

As already mentioned, for resolving the above cell resequencing problem it is important to correlate in phase the two clock means with a relatively high accuracy. This phase correlation may either consist in synchronizing in phase the first and the second clock means or in determining their phase difference which then will be take into account for performing the cell resequencing.

According to the invention, the method for correlating in phase the two clock means is characterized in that said first clock means sends a then produced first time stamp value to said second clock means via said transmission link and that said second clock means produce a second time stamp value upon receipt of said first time stamp value whereby a time stamp compensation value is determined at the location of said second clock means, said time stamp compensation value being substantially equal to the difference between said second and said first time stamp values and being a function of both the phase shift between said first and second clock means and a fixed transfer delay which is equal to the minimum delay needed for transmitting a time stamp value between said clock means.

Alternatively, upon receipt of said first time stamp value, said second clock means immediately returns the then produced second time stamp value to said first clock means whereby said time stamp compensation value is determined a the location of said first clock means.

Another characteristic feature of the present method is that a time stamp offset value is determined at said location of said first clock means, said time stamp offset value being equal to the difference between said second time stamp value and the half of the sum of said first time stamp value and another first time stamp value produced by said first clock means upon receipt of said second time stamp value from said second clock means, and corresponding to the difference between a said first time stamp value and a said second time stamp value simultaneously produced by said first and said second clock means respectively.

Also another characteristic feature of the present method is that said fixed transfer delay is determined at said location of said first clock means as being substantially equal to the half of the difference between said other first time stamp value and said first time stamp value.

In the present invention, said fixed transfer delay is substantially equal to the difference between said time stamp compensation value and said time stamp offset value, and said first and second time stamp values are each carried by a cell of said telecommunication network, said cells being transmitted over said transmission link.

As a result, the present method suits perfectly to the above cell resequencing system.

BRIEF DESCRIPTION OF THE DRAWINGS

The above mentioned and other objects and features of the invention will become more apparent and the invention itself will be best understood by referring to the following description of an embodiment taken in conjunction with the accompanying drawings wherein.

BEST MODE FOR CARRYING OUT THE INVENTION

Figure 1:
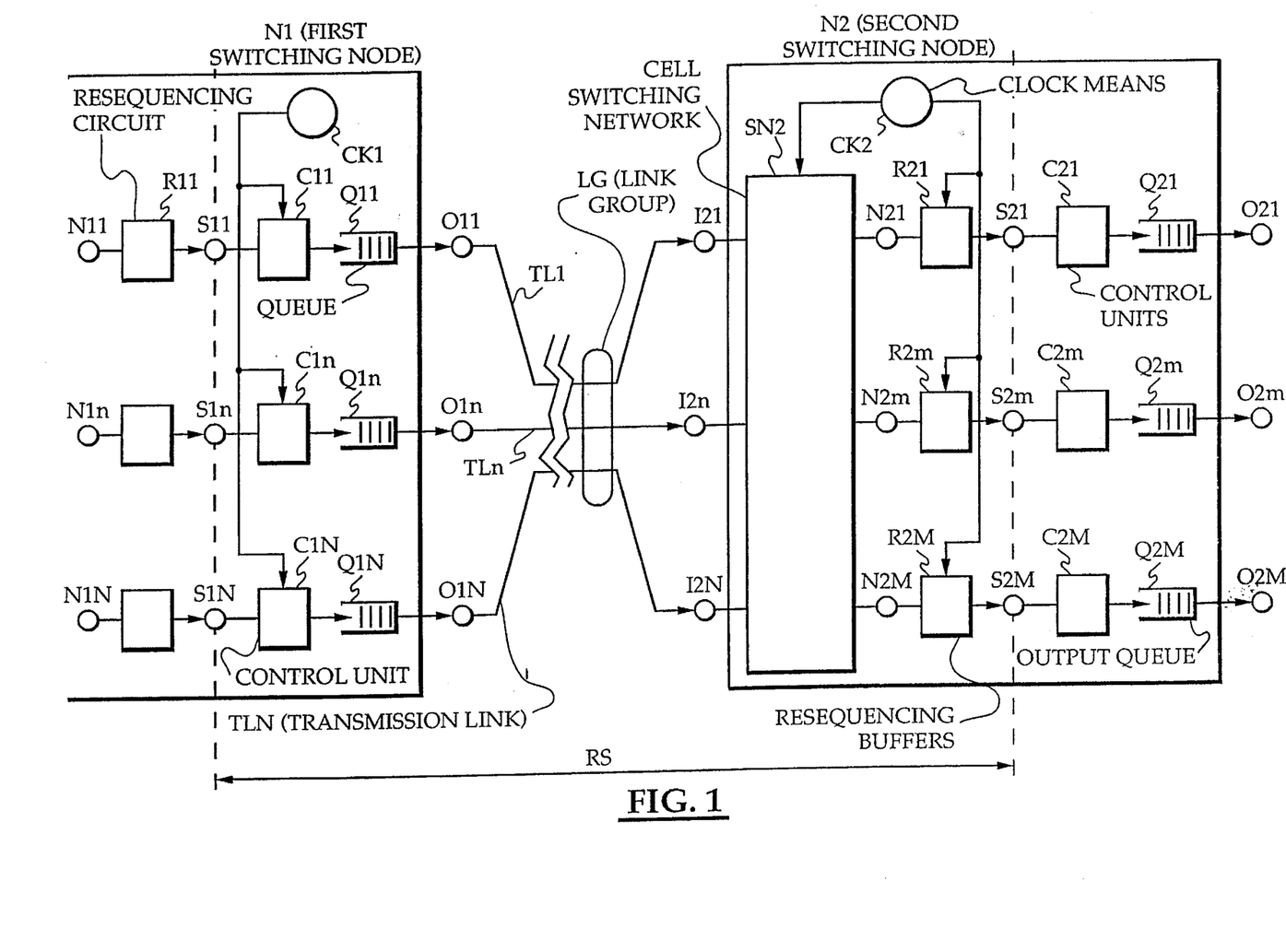
FIG. 1 shows a resequencing section RS including a cell resequencing system C1l/C1n/C1N, CK1, R2l/R2m/R2M and CK2 according to the invention.

The resequencing section RS shown in FIG. 1 forms part of a multilink self-routing cell switching telecommunication network through which cells or packet of information are transmitted from an input to an output (both not shown on FIG. 1). The telecommunication network includes at least two switching nodes N1, N2 interconnected by means of transmission links TLl/TLn/TLN.

In more detail, the switching node N2 has node inputs I2l/I2n/I2N and node outputs O2l/O2m/O2M and includes an asynchronous cell switching network SN2 having inlets I2l/I2n/I2N corresponding respectively to the like named node inputs of N2, and has outlets N2l/N2m/N2M. SN2 is able to transfer a cell received at anyone of its inlets to at least one of its outlets. Each outlet N2l/N2m/N2M of SN2 is connected to a respective resequencing circuit R2l/R2m/R2M including like named latching means also called resequencing buffers and used for storing the cells during a variable time delay as will be explained later. The outputs S2l/S2m/S2M of the resequencing circuits R2l/R2m/R2M correspond to the like named outputs of the resequencing section RS and are coupled to the node outputs O2l/O2m/O2M via the series connection of control units C2l/C2m/C2M and output queues Q2l/Q2m/Q2M respectively. Finally, the switching node N2 is provided with clock means CK2 controlling the operation of both the switching network SN2 and the resequencing circuits R2l/R2m/R2M.

The switching node N1 is similar to the switching node N2 but only outlets N1l/N1n/N1N, resequencing circuits R1l/R1n/R1N, switching outputs S1l/S1n/S1N which correspond to the like named inputs of the resequencing section RS, control units C1l/C1n/C1N, output queues Q1l/Q1n/Q1N, node outputs O1l/O1n/O1N and clock means CK1 are shown.

The present multilink telecommunication network has a plurality of transmission links TL1, ..., TLn, ..., TLN each interconnecting a node output O1l/O1n/O1N of the node N1 to the corresponding node inputs I2l/I2n/I2N of the node N2. This telecommunication network is of the type disclosed in the European Patent Application EP 91201915.5 (VERHILLE 11) wherein the node outputs O1l/O1n/O1N of N1 and thus also the transmission links TLl/TLn/TLN are arranged in a "link group" LG. This means that the cells to be transmitted from N1 to N2 are dynamically distributed in N1 over all these node outputs and thus also over these transmission links. This is also true for cells belonging to a same communication. A better use of the different paths, e.g. transmission links, which may be followed by the cells is so obtained.

Since the cells follow different paths, they are subjected to different delays during their transfer through the telecommunication network. As a consequence, a cell resequencing needs to be performed, this cell resequencing consisting of supplying at an output S2l/S2m/S2M of the resequencing section RS the cells in the same order or sequence as they were applied to the inputs S1l/S1n/S1N of this section.

Based on the teaching of the International Patent Application PCT/EP89/00941 (HENRION 17) applied to the present case, a suitable cell resequencing method consists in:

associating to each cell arriving at any of the inputs S1l/S1n/S1N of the resequencing section RS a first time stamp value then generated by a time stamp generator or clock means;

receiving this cell in a resequencing buffer R2l/R2m/R2M after a first variable time delay needed by the cell for being transferred from the input S1l/S1n/S1N to an outlet N2l/N2m/N2M of the switching network SN2; and releasing this cell from the resequencing buffer R2l/R2m/R2M to the output S2l/S2m/S2M after a second variable time delay which is so chosen that the sum of the first and the second variable time delay is equal to the predetermined constant time value, i.e. only when the clock means generates a second time stamp value which is such that the difference between this second time stamp value and the first time stamp value is equal to the predetermined constant time value.

However, in the last mentioned patent application, the cell resequencing operation is performed in a resequencing section RS which only includes one switching network SN2, i.e. between the inlets I2l/I2n/I2N and the outputs S2l/S2m/S2M, and wherein both the first and the second time stamp values are generated by the same clock means, e.g. CK2.

It is known from that document that the size of the resequencing buffers R2l/R2m/R2M is proportional to the predetermined constant time value and thus increases with the first variable time delay needed by the cell for being transmitted from the inlets I2l/I2n/I2N to the outlets N2l/N2m/N2M of the switching network SN2. It is further clear that the probability to succeed the cell resequencing operation also increases with this predetermined constant time value. In theory the predetermined constant time value should be chosen at least equal to the maximum transmission delay required by any cell to be transmitted from an inlet I2l/I2n/I2N to an outlet N2l/N2m/N2M, but such a large predetermined constant time value will require relatively large resequencing buffers R2l/R2m/R2M. Therefore in practice, the predetermined constant time value is so chosen that the probability that the cell resequencing operation fails, i.e. that the variable delay incurred by a cell exceeds the predetermined constant time value, is so small that it results in negligeable cell loss, whilst the size of the resequencing buffer remains acceptable, i.e. relatively small. Moreover, this known cell resequencing method does not relate to a resequencing section RS of a multilink telecommunication network as mentioned above, nor to a resequencing section RS including relative long transmission links TLl/TLn/TLN, e.g. of several kilometers, arranged in a link group LG.

In the present case however, the resequencing section RS starts at the outlets S1l/S1n/S1N of the switching network SN1 of the node N1 and includes, additionally to the switching network SN2 and the resequencing circuits R2l/R2m/R2M, output queues Q1l/Q1n/Q1N and a link group LG of transmission links TLl/TLn/TLN which may imply short or long distances.

Because of the possible long distance between the nodes N1 and N2, two distinct clock means CK1 and CK2 are used instead of the above single common clock means controlling both the inputs and the outputs of the resequencing section RS. These clock means CK1 and CK2 have to be synchronized in phase or, if not, additional means have to be provided to determine their relative phase shift or phase difference, i.e. their phase decorrelation, with a relative high accuracy.

The first time stamp values are generated by the clock means CK1 and are associated to the incoming cells by control units C11/C1n/C1N each coupled to a distinct input S11/S1n/S1N of RS and controlled by CK1. Because the cells to keep in sequence are not all comming from a single switching output S11/S1n/S1N of N1 but may arrive at any input S11/S1n/S1N of the resequencing section RS, these cells are in a "relative" sequence at the level of these inputs S11/S1n/S1N. Furthermore, because these cells may be subjected to different delays in the different output queues Q11/Q1n/Q1N of N1, the control units C11/C1n/C1N need to be located before these output queues Q11/Q1n/Q1N, the latter preceding the transmission links TL1/TLn/TLN.

The second time stamp values are generated by the clock means CK2 for controlling the operation of the resequencing circuits R21/R2m/R2M.

As already mentioned, the size of each resequencing buffer R21/R2m/R2M is a function of the above first variable time delay which, in the present case, includes the latching delay caused by the output queue Q11/Q1n/Q1N, the transmission delay of the cell over the transmission link TL1/TLn/TLN and the delay caused by the switching network SN2. If the sum of these delays is to be taken into account for determining the size of each of the resequencing buffers R21/R2m/R2M, this size will become too large, i.e. unaccepatable.

To reduce this size, the first variable time delay could theoretically be reduced by an absolute minimum transfer delay below which no cell can be transmitted from any input S11/S1n/S1N of RS to any outlet N21/N2m/N2M of SN2. However, for practical reasons, this theoretical absolute minimum transfer delay is replaced by a minimum transmission delay below which no cell can be transmitted over a transmission link TL1/TLn/TLN, i.e. between the node output O11/O1n/O1N and the node input I21/I2n/I2N respectively. This minimum transmission delay is easier to determine, e.g. by measurement or by engineering, than the theorical absolute minimum transfer delay and the approximation so performed is negligible. Further in this description, the minimum transmission delay will be referred to as fixed transfer delay TD.

The first time stamps values generated by the clock means CK1 are thus compensated for the fixed transfer delay TD. This is performed by time stamp compensation circuits provided in the like named control units C11/C1n/C1N (not shown in detail). Each time stamp compensation circuit C11/C1n/C1N adds to the first time stamp value generated by CK1 the fixed transfer delay TD corresponding to the transmission link TL1/TLn/TLN respectively coupled thereto.

Instead of being provided in the control units C11/C1n/C1N, the time stamp compensation circuits may also be located between the transmission links TL1/TLn/TLN and the inlets I21/I2n/I2N of the switching network SN2. However in that case two handlings of the cells are necessary: a first in the control units C11/C1n/C1N for associating first time stamp values to the cells and a second one in the separated time stamp compensation circuits for modifying these first time stamp values.

Also another solution is to locate a common time stamp compensation circuit at the level of the resequencing circuit R21/R2m/R2M. Although this solution is equivalent to the preceding ones in case of a single transmission link between N1 and N2, it becomes almost impossible to implement in the case of a link group LG of transmission links TL1/TLn/TLN between these two nodes. Indeed, in that case, one ignores from which inlet I21/I2n/I2N of BN2 the cell is coming, i.e. to which fixed transfer delay the cell was subjected prior to reach this inlet. Thus, one also ignores which time stamp compensation has to be applied to each individual cell. As a consequence, a cell resequencing mechanism starting at the level of resequencing circuit R21/R2m/R2M should have no meaning. The only possibility would then be to take into account a minimum fixed transfer delay TD which is the lowest fixed transfer delay amongst those corresponding to each of the individual transmission links TL1/TLn/TLN of the link group LG. As a result, the sizes of all the resequencing buffers R21/R2m/R2M of the node N2 are then determined by this single minimum fixed transfer delay TD and are thus identical but not optimized.

Up to now it was considered that the two clock means CK1 and CK2 were in phase. From now, one will explain how to compensate a possible phase shift or phase difference between the two clock means, i.e. when these clock means are not correlated in phase.

Figure 2:
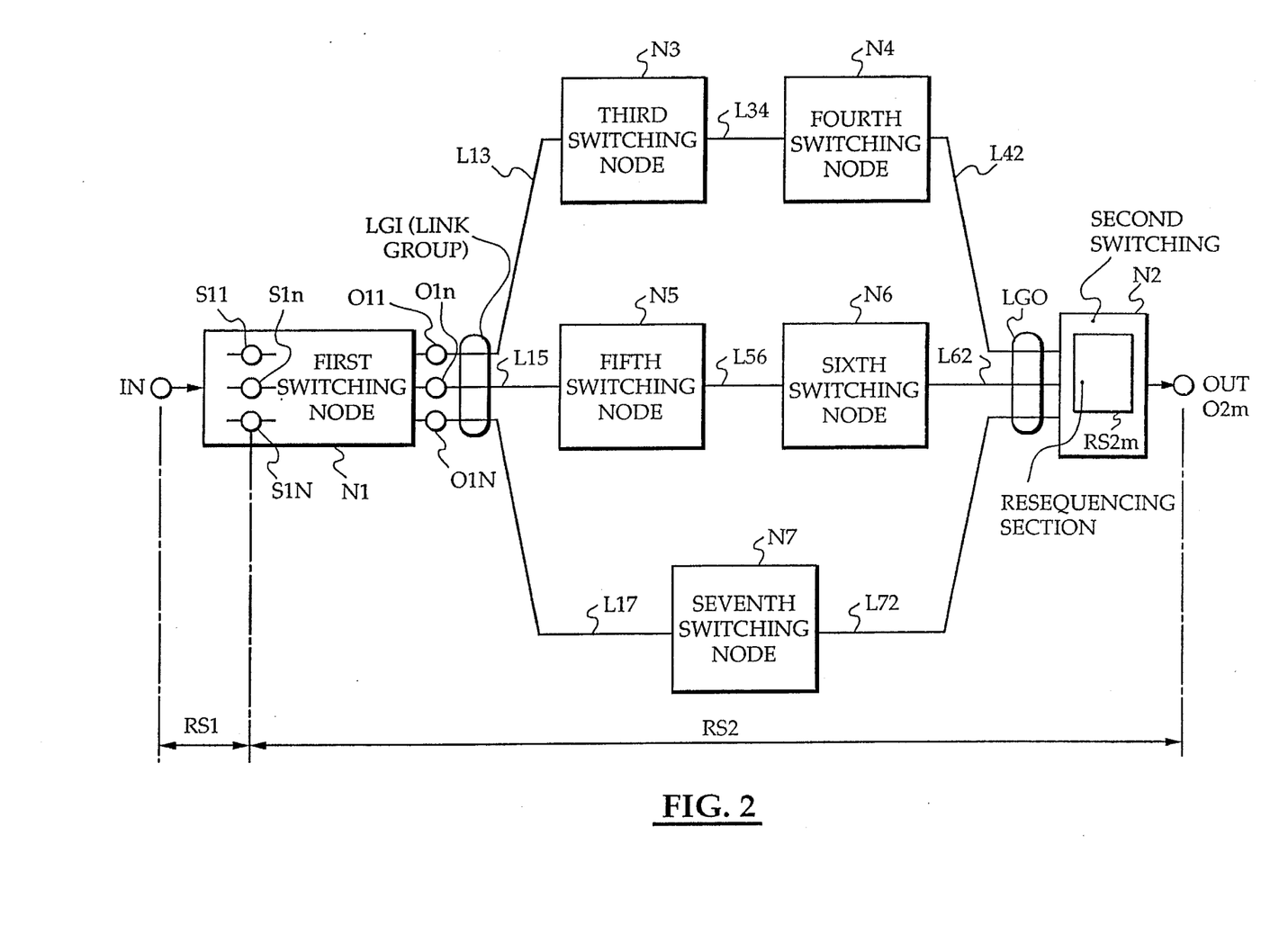
FIG. 2 shows a telecommunication network including at least one resequencing section as shown in FIG. 1.

An example of a telecommunication network including several resequencing sections RS1, RS2 between an input IN and an output OUT, e.g. the node output O2m of the switching network N2, is shown in FIG. 2. This telecommunication network includes three parallel branches through which a cell may be transmitted from IN to OUT. Each branch includes at least a transmission link or a link group labelled with a prefix L and a switching node labelled with a prefix N. The first N1 and the last N2 switching nodes of the telecommunication network are common for the three branches.

The first resequencing section RS1 of the telecommunication network shown in FIG. 2 only includes the switching node N1. Since the cells are applied at the single node input IN and exit at anyone of the switching outputs S11/S1n/S1N and so further at the node outputs O11/O1n/O1N arranged in a link group LGI, this first resequencing section RS1 between IN and S11/S1n/S1N is similar and may be compared to the one described in the above mentioned International Patent Application PCT/EP89/00941 (HENRION 17). Moreover, although the cells are dynamically distributed over the switching outputs S11/S1n/SIN of N1, they appear in a relative correct order or sequence at these outputs.

It is to be noted that instead of being single node outputs, O11/O1n/O1N may also be each constituted by several node outputs of N1 arranged in link groups L13/L15/L17 respectively. These link groups L13/L15/L17 form together a common link group LGI of the output of N1. Obviously, the same applies to the corresponding switching outputs S11/S1n/S1N.

The second resequencing section RS2 of the telecommunication network includes the three parallel branches. The first branch includes the series connection of L13, N3, L34, N4, L42 and N2, the second branch includes L15, N5, L56, N6, L62 and N2 and the third branch includes L17, N7, L72 and N2. The link groups L42, L62 and L72 are arranged in a bigger link group LGO arriving at the node inputs of N2.

The inputs of the second resequencing section RS2 are the switching outputs S11/S1n/S1N of the switching network included in the node N1 and the outputs of RS2 are the switching outputs of the switching network included in the node N2, the latter switching outputs and the switching networks of N1 and N2 not being shown in FIG. 2. Within R52, none of the switching nodes needs to be provided with control units for associating first time stamp values to each cell, and only the switching node N2 needs to be provided with a resequencing circuit RS2m controlled by second time stamp values.

In an alternative embodiment, the telecommunication network is provided with a single resequencing section constituted by the combination of RS1 and RS2 in series. In such an end-to-end cell resequencing system, the switching node N1 needs only to be provided with one control unit which associates a first time stamp value to each cell arriving at the single input IN.

In the latter cases of one or two resequencing sections, the fixed transfer delay TD is chosen equal to a minimum fixed transfer delay which is the lowest transmission delay amongst the three following values: the sum of the minimum transmission delays over L13, L34 and L42 in series; the sum of the minimum transmission delays over L15, L56 and L62 in series; and the sum of the minimum transmission delays over L17 and L72 in series.

Alternatively, the second resequencing section RS2 may also be replaced by several smaller resequencing sections each including a pair of a link group L and a switching node N, i.e. L13, N3; L34, N4; L42, N2; L15, N5; L56, N6; L62, N2; L17, N7 and L72, N2. In such a section-by-section cell resequencing system, each switching node N1 to N7 needs to be provided with resequencing circuits. However, it has the advantage that the resequencing buffers of the individual switching nodes N3, N4, N5, N6, N7 and N2 are relatively smaller than the single resequencing buffer of the switching node N2 in the above embodiments. Because of the parallel branches, this section-by-section cell resequencing system in not easy to implement in the present case. However, in a simplified version (not shown in detail) of this telecommunication network, for instance including only one branch with the resequencing sections N1; L13, N3; L34, N4 and L42, N2 in series, each switching node N1, N3, N4 and N2 may include its own resequencing circuits. In such a simple section-by-section cell resequencing system, the resequencing of the cells is performed in each resequencing section by taking into account fixed transfer delay TD which is equal to the minimum transmission delay of any cell over each of the transmission links of the link group L forming part of this resequencing section, i.e. L13, L34 and L42.

As already mentioned and by making again reference to FIG. 1, additionally to the necessity of compensating the absolute transmission delays between the inputs S11/S1n/S1N and the output S21/S2m/S2M of a resequencing section RS by the fixed transfer delay TD in order to keep the resequencing buffers R21/R2m/R2M within an acceptable size, another problem rises with a geographically distributed telecommunication network. Indeed, because of the relatively long transmission links TL1/TLn/TLN of the link group LG, it is difficult to provide a single clock means which is able to generate simultaneously a same time reference accurately synchronized in phase, i.e. a same time stamp value with typically 100 nanosecond phase difference, both at the location of the time stamp compensation circuits and at the location of the resequencing circuits R21/R2m/R2M. Therefore, two clock means CK1 and CK2 are provided: CK1 being associated to the control units C11/C1n/C1N of the switching node N1 and CK2 being associated to the resequencing circuits R21/R2m/R2M of the switching node N2. These two clock means CK1 and CK2 are synchronized in frequency but not in phase and their mutual out-phasing or relative phase shift needs to be correlated for obtaining coherent time stamp values. The phase shift or phase difference between CK1 and CK2 is expressed by a time stamp compensation or offset value TOC as will be explained below.

In the following part of the description, only one resequencing section RS as shown in FIG. 1 will be considered by way of an example for describing the cell resequencing mechanism. This description can easily be extended to a more complex telecommunication network, e.g. as shown in FIG. 2, using either the section-by-section cell resequencing, the end-to-end cell resequencing or a combination of both.

A common solution for the above two problems, i.e. of the transmission delay compensation and of the phase correlation or correction of the out-phasing of the two clock means, consists in performing an appropriate modification on the first time stamp values generated by the clock means CK1 and associated to each incoming cell at the inputs S11/S1n/S1N. This modification should compensate for both the fixed transfer delay TD and the time stamp offset value TOC.

The fixed transfer delay TB can be obtained either by network engineering, i.e. by calculating it as a function of the physical length of the transmission link TL1/TLn/TLN, or by measurement at an initialization time, i.e. without traffic on the measured transmission link TL1/TLn/TLN and without latching delays in the output queue Q11/Q1n/Q1N coupled thereto respectively.

For determining the time stamp offset value TOC, different approaches are possible and will be analyzed below.

A first approach consists in synchronizing in phase and in frequency the clock means CK1 and CK2. The time stamp offset value TOC will then be reduced to zero since the same time stamp value will, at the same moment, i.e. simultaneously, be available at any point on the network. However, as already mentioned, this is difficult to realize in practice because of the required high phase accuracy, e.g. of about 100 nanosecond, and of the long distances, e.g. several kilometers, between the switching nodes N1 and N2.

A second approach consists in synchronizing in frequency the clock means CK1 and CK2 and in determining their out-phasing or phase shift, i.e. the compensating time stamp offset value TOC, at initialization time on the basis of pre-engineered network parameters. However, in this case the pre-engineering is very complex and the pre-initialization and subsequent monitoring of the clock phase shifts for each telecommunication network practically rules out this approach.

A third and preferred approach consists in determining the phase shift between the clock means CK1 and CK2 which may run either in a synchronous or in a plesiochronous frequency mode. In fact, it is not strictly necessary that the clock means CK1 and CK2 be fully synchronous in frequency as long as we are able to additionally determine their relative phase shift. In this approach, the phase shift between the clock means CK1 and CK2 is measured on a quasi-continuous basis and no pre-engineering is required.

A method for measuring the phase shift between the clock means CK1 and CK2 and subsequently determining a time stamp compensation value TTC in order to obtain a common compensation for both the transmission delay and the phase shift is described below by making reference to FIG. 3 which shows an example of time stamp values generated by the two clock means CK1 and CK2.

In this example, the measurements are performed at a location A which corresponds to the transmitter end of a transmission link TL1/TLn/TLN of FIG. 1, i.e. at a node output O11/O1n/O1N of the switching node N1, and at a location B which corresponds to the receiver end of a transmission link TLl/TLn/TLN, i.e. at the location of an inlet I2l/I2n/I2N of the switching network SN2.

It is to be noted that the location A preferably corresponds to the switching outputs Sll/Sln/SiN because the control units Cll/Cln/C1N controlled by the clock CK1 are already present at that location. However, the measurements are then only validly performed during the pre-initialization of the telecommunication network, i.e. without telecommunication trafic, so that the variable latching delays in the output queues Q1l/Q1n/Q1N are then reduced to zero.

Figure 3:
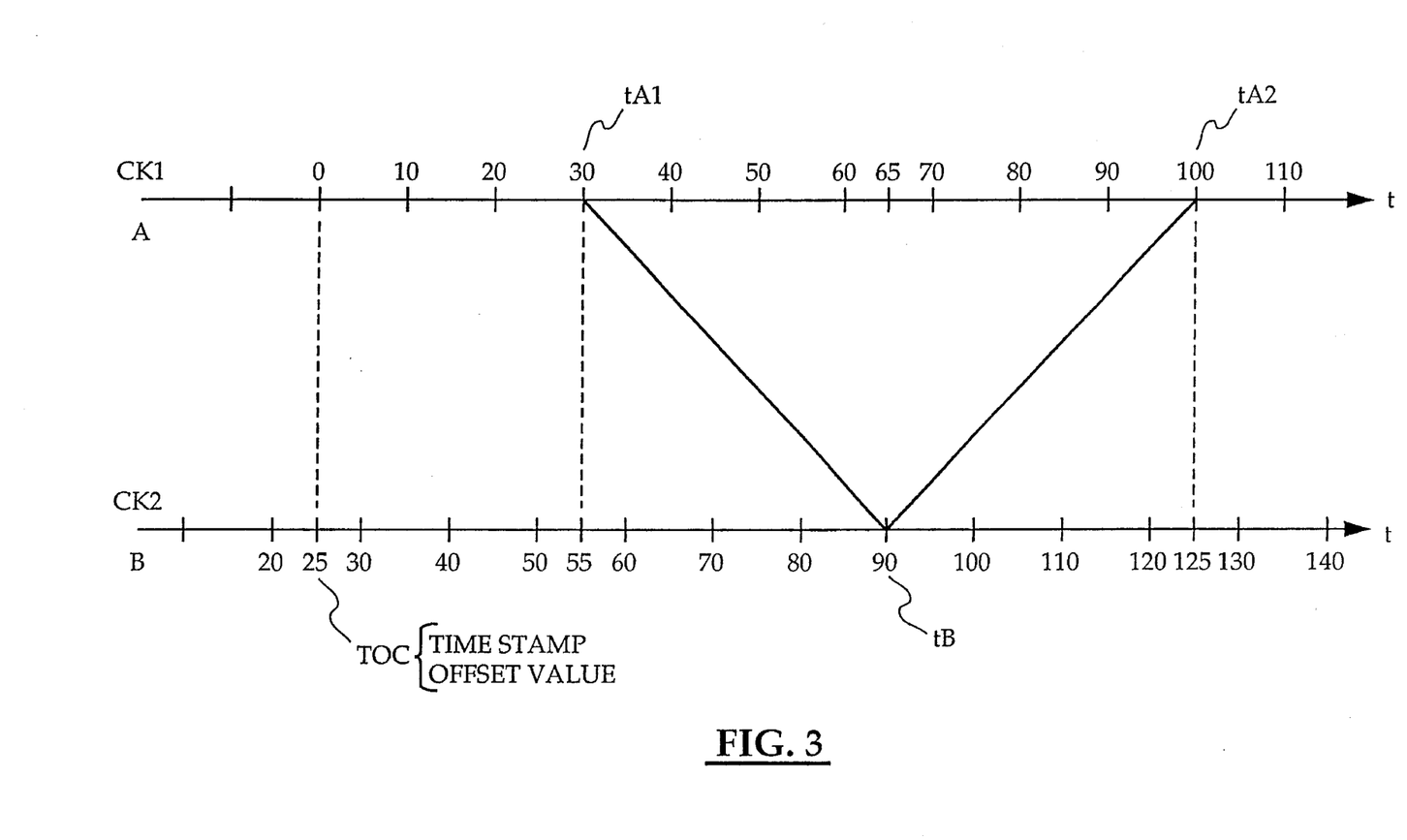
FIG. 3 is a time diagram of the transmissions of time stamp values tA1, tA2 and tB of two clock means CK1 and CK2 to be correlated in phase according to the method of the present invention.

In the example given at FIG. 3, at the start of the measurement the clock means CK1, associated to the location A, generates a time stamp value 0 while the clock means CK2, associated to the location B, simultaneously generates a time stamp value 25. In this example, the time stamp offset value TOC is thus equal to 25 and the fixed transfer delay TD is set equal to 35. As a result, the time stamp compensation value TTC, which is equal to the sum of the time stamp offset value TOC and the fixed transfer delay TD, is equal to 60 and the following relation may be $$TTC = TOC + TD \quad (1)$$

By means of telecommunication cells used as carriers over the transmission link TLl/TLn/TLN, the clock means CK1 and CK2 exchange time stamp values. For instance, when the clock means CK1 generates a first time stamp value $tA1=30$, the latter is sent to the clock means CK2. While receiving the time stamp value tA1, the clock means CK2 generates a second time stamp value $tB=90$. This clock means CK2 then immediately returns its generated time stamp value, i.e. $tB=90$, to the clock means CK1. While receiving the time stamp value tB, the clock means CK1 generates another first time stamp value $tA2=100$.

At the location A, the time stamp offset value TOC is then determined as:

$$TOC = tB - (tA1 + tA2)/2 \quad (2)$$

and the fixed transfer delay TD is determined as:

$$TD = (tA2 - tA1)/2 \quad (3)$$

Both at the locations A and B, the time stamp compensation value TTC may be determined as:

$$TTC = tB - tA1 \quad (4)$$

The values of TOC and TD may be obtained in a similar way at the location B. This procedure is obvious and therefore not described in detail here.

In case the two clock means CK1 and CK2 are synchronized in frequency, the above measurements need to be performed only once, e.g. during the initialization phase. However, if these clock means CK1 and CK2 operate in a plesiochronous mode, the continuous frequency shift requires variable phase compensation parameters and the above measurement has to be repeated periodically.

As already mentioned, the measurement should not be affected by any significant variable delay component such as a latching delay in an output queue, e.g. prior to return a time stamp value. Moreover, it is assumed that the transmission delay is the same from A to B and from B to A over a predetermined transmission link TLl/TLn/TLN. This assumption is however no longer necessary when only the time stamp compensation value TTC is used for compensating simultaneously both the time stamp offset value TOC and the fixed transfer delay TD from A to B.

While the principles of the invention have been described above in connection with specific apparatus, it is to be clearly understood that this description is made only by way of example and not as a limitation on the scope of the invention.

We claim:

1. A cell resequencing system for a resequencing section (RS) of a telecommunication network through which cells of communications are transmitted, said resequencing section having at least one input (S1l/S1n/S1N) and at least one output (S2l/S2m/S2M) and including at least one cell switching network (SN2) having at least one inlet (I2l/I2n/I2N) coupled to said input and at least one outlet (N2l/N2m/N2M), the cells transmitted from said input to said outlet being subjected to a first variable time delay and said cell resequencing system (C1l/C1n/C1N, CK1; R2l/R2m/R2M, CK2) including latching means (R2l/R2m/R2M) coupled between said outlet and said output so as to subject said cells to a second variable time delay which is so chosen that for each cell the sum of said first and second variable time delay is substantially equal to a predetermined constant time value, said predetermined constant time value determining the size of said latching means, characterized in that said resequencing section (RS) has at least two of said inputs (S1l/S1n/S1N) each coupled to a distinct inlet (I2l/I2n/I2N) via a distinct transmission link (TLl/TLn/TLN), said inputs and said transmission links being arranged in a link group (LG), that said cells are supplied at any one of said inputs of said link group and are subjected to at least a fixed transfer delay (TD) during their transfer from said input to said outlet (N2l/N2m/N2M), said fixed transfer delay forming part of said first variable time delay, and that the minimum size of said latching means (R2l/R2m/R2M is determined by the difference between said predetermined constant time value and said fixed transfer delay (TD).

2. A cell resequencing system according to claim 1, characterized in that said fixed transfer delay (TD) is substantially equal to the minimum transmission delay below which no cell can be transmitted over a transmission link (TLl/TLn/TLN) of said link group (LG).

3. A cell resequencing system according to claim 1, characterized in that said resequencing section includes a plurality of switching networks (N1, N3, N4, N2) interconnected by link groups (L13, L34, L42) of transmission links and that said fixed transfer delay (TD) is substantially equal to the sum of the fixed transfer delays of said link groups.

4. A cell resequencing system according to claim 1, characterized in that said telecommunication network includes a plurality of series connected resequencing sections (L13/N3, L34/N4, L42/N2), each resequencing section including a link group (L13, L34, L42) of transmission links connected in series with a switching network (N3, N4, N2).

5. A cell resequencing system according to claim 1, characterized in that said resequencing section includes a plurality of parallel branches (N1, L13/N3, L34/N4, L42/N2; N1, L15/N5, L56/N6, L62/N2; N1, L17/N7, L72/N2), each branch comprising at least one link group (LGI; L13, L34, L42; L15, L56, L62; L17, L72; LGO) of transmission links, each link group being connected in series with a switching network (N1, N3, N4, N2; N1, N5, N6, N2; N1, N7, N2), and that said fixed transfer delay (TD) is substantially equal to the lowest sum amongst the sums of the fixed transfer delays of the link groups of each branch.

6. A cell resequencing system according to, claim 5, characterized in that said switching network (SN2) has means for transferring the cells from any one of said inlets (I2l/I2n/I2N) to at least one of said outlets (N2l/N2m/N2M).

7. A cell resequencing system according to claim 1, characterized in that said cell resequencing system (C1l/C1n/C1N, CK1; R2l/R2m/R2M, CK2) further includes:
- first clock means (CK1) producing successive first time stamp values (tA1, tA2) which are associated to said cells at each of said inputs (S1l/S1n/S1N);
- second clock means (CK2) producing successive second time stamp values (tB) for controlling said latching means (R2l/R2m/R2M); and
- clock compensation means (C1l/C1n/C1N) for compensating both said fixed transfer delay (TD) and a clock phase shift between said first and said second clock means.

8. A cell resequencing system according to claim 7, characterized in that said clock compensation means (C1l/C1n/C1N) performs said compensation as a function of a time stamp compensation value (TTC) which is substantially equal to the sum of a time stamp offset value (TOC) and of said fixed transfer delay (TD), said time stamp offset value being substantially equal to the difference between a said first time stamp value and a said second time stamp value simultaneously produced by said first (CK1) and said second (CK2) clock means respectively.

9. A cell resequencing system according to claim 7, characterized in that clock compensation means (C1l/C1n/C1N) are coupled between each of said inputs (S1l/S1n/S1N) and the transmission link (TLl/TLn/TLN) coupled thereto.

10. A cell resequencing system according to claim 9, characterized in that said resequencing section (RS) further includes buffer means (Q1l/Q1n/Q1N) each coupled between said clock compensation means (C1l/C1n/C1N) and the transmission link (TLl/TLn/TLN) coupled thereto.

11. A method for correlating in phase a first clock means (CK1) producing successive first time stamp values (tA1, tA2) with a second clock means (CK2) producing successive second time stamp values (tB), both said clock means forming part of a telecommunication network and being interconnected by at least one transmission link (TLl/TLn/TLN; LG), characterized in that said first clock means (CK1) sends a then produced first time stamp value (tA1) to said second clock means (CK2) via said transmission link (TLl/TLn/TLN) and that said second clock means produces a second time stamp value (tB) upon receipt of said first time stamp value whereby a time stamp compensation value (TTC) is determined at the location (B) of said second clock means, said time stamp compensation value being substantially equal to the difference between said second and said first time stamp values and being a function of both the phase shift between said first and second clock means and a fixed transfer delay (TD) which is equal to the minimum delay needed for transmitting a time stamp value between said clock means.

12. A method for correlating in phase a first clock means (CK1) producing successive first time stamp values (tA1, tA2) with a second clock means (CK2) producing successive second time stamp values (tB), both said clock means forming part of a telecommunication network and being a interconnected by at least one transmission link (TLl/TLn/TLN; LG), characterized in that said first clock means (CK1) sends a then produced first time stamp value (tA1) to said second clock means (CK2) via said transmission link (TLl/TLn/TLN) and that said second clock means, upon receipt of said first time stamp value, immediately returns a then produced second time stamp value (tB) to said first clock means, whereby a time stamp compensation value (TTC) is determined at the location (A) of said first clock means, said time stamp compensation value being substantially equal to the difference between said second and said first time stamp values and being function of both the phase shift between said first and second clock means and a fixed transfer delay (TD) which is equal to the minimum delay needed for transmitting a time stamp value between said clock means.

13. A method according to claim 12, characterized in that the same transmission link (TLl/TLn/TLN) is used for transmitting said first time stamp value (TA1) from said first (CK1) to said second (CK2) clock means and said second time stamp value (tB) from said second to said first clock means, whereby said fixed transfer delay (TD) is substantially identical for transmitting both said first and second time stamp values.

14. A method according to claim 12, characterized in that a time stamp offset value (TOC) is determined at said location (A) of said first clock means (CK1), said time stamp offset value being substantially equal to the difference between said second time stamp value (tB) and half of the sum of said first time stamp value (tA1) and another first time stamp value (tA2) produced by said first clock means upon receipt of said second time stamp value from said second clock means (CK2), and corresponding to the difference between said first time stamp value and said second time stamp value simultaneously produced by said first and said second clock means respectively.

15. A method according to claim 14, characterized in that said fixed transfer delay (TD) is determined at said location (A) of said first clock means (CK1) as being substantially equal to half of the difference between said other first time stamp value (tA2) and said first time stamp value (tA1).

16. A method according to claim 15, characterized in that said fixed transfer delay (TD) is substantially equal to the difference between said time stamp compensation value (TTC) and said time stamp offset value (TOC).

17. A method according to claim 11, characterized in that said first (tA1) and second (tB) time stamp values are each carried by a cell of said telecommunication network, said cells being transmitted over said transmission link (TLl/TLn/TLN).

18. A cell resequencing system according to claim 1, characterized in that said switching network (SN2) has means for transferring the cells from any one of said inlets (I2l/I2n/I2N) to at least one of said outlets (N2l/N2m/N2M).

* * * * *

UNITED STATES PATENT AND TRADEMARK OFFICE
CERTIFICATE OF CORRECTION

PATENT NO. : 5,491,728
DATED : Feb. 13, 1996
INVENTOR(S) : Verhille et al.

It is certified that error appears in the above-indentified patent and that said Letters Patent is hereby corrected as shown below:

At column 14, line 14 (Claim 12, line 14), after "being", --a-- should be inserted.

Signed and Sealed this

Eighteenth Day of June, 1996

Attest:

BRUCE LEHMAN

*Attesting Officer*  *Commissioner of Patents and Trademarks*